United States Patent
Mayhew et al.

(10) Patent No.: US 11,734,158 B1
(45) Date of Patent: Aug. 22, 2023

(54) METHODS AND SYSTEMS FOR EMULATING PHYSICAL-DEVICE INPUT FOR AN AUTOMATED-TESTING FRAMEWORK

(71) Applicant: GameDriver, Inc., Martinez, CA (US)

(72) Inventors: Phillip Todd Mayhew, Cary, NC (US); Shane Christopher Evans, Martinez, CA (US); Robert John Gutierrez, British Columbia (CA)

(73) Assignee: GameDriver, Inc., Martinez, CA (US)

( * ) Notice: Subject to any disclaimer, the term of this patent is extended or adjusted under 35 U.S.C. 154(b) by 0 days.

(21) Appl. No.: 18/170,516

(22) Filed: Feb. 16, 2023

(51) Int. Cl.
*G06F 11/36* (2006.01)
(52) U.S. Cl.
CPC .............................. *G06F 11/3664* (2013.01)
(58) Field of Classification Search
CPC .................................................. G06F 11/2221
See application file for complete search history.

(56) References Cited

U.S. PATENT DOCUMENTS

| | | | |
|---|---|---|---|
| 6,571,358 B1 * | 5/2003 | Culotta | H04Q 3/54591 370/242 |
| 10,452,775 B2 * | 10/2019 | Kapoor | G09B 7/00 |
| 11,093,373 B1 * | 8/2021 | Dewitt | G06F 11/3672 |
| 11,216,358 B2 | 1/2022 | Mayhew et al. | |
| 2016/0170779 A1 * | 6/2016 | Zielinski | G06F 9/461 703/26 |

* cited by examiner

*Primary Examiner* — Henry Tsai
*Assistant Examiner* — Juanito C Borromeo
(74) *Attorney, Agent, or Firm* — William E. Wooten; WEW IP Law PLLC

(57) ABSTRACT

The present disclosure is directed to emulating physical-device input for an automated-testing framework. In particular, the methods and systems of the present disclosure may: determine a physical-device input associated with an automated-test script for an automated-testing framework comprising one or more proprietary test devices; emulate, via the automated-testing framework and at least one proprietary physical input device associated with the proprietary test device(s), the physical-device input; receive, from the proprietary test device(s) and via the automated-testing framework, data generated responsive to the emulated physical-device input; and compare the data generated responsive to the emulated physical-device input with expected data specified by the automated-test script for the automated-testing framework.

20 Claims, 3 Drawing Sheets

METHODS AND SYSTEMS FOR EMULATING PHYSICAL-DEVICE INPUT FOR AN AUTOMATED-TESTING FRAMEWORK

FIELD

The present disclosure relates generally to automated testing. More particularly, the present disclosure relates to methods and systems for emulating physical-device input for an automated testing framework.

BACKGROUND

Computing devices (e.g., desktop computers, laptop computers, tablet computers, set-top devices, smartphones, game consoles, wearable computing devices, and/or the like) are ubiquitous in modern society. Such computing devices may execute a variety of software applications (e.g., associated with productivity, gaming, entertainment, and/or the like). It may often be advantageous to automate testing of such software applications, e.g., to evaluate their functionality, and/or the like.

SUMMARY

Aspects and advantages of embodiments of the present disclosure will be set forth in part in the following description, or may be learned from the description, or may be learned through practice of the embodiments.

One example aspect of the present disclosure is directed to a method. The method may include determining, by one or more computing devices, a physical-device input associated with an automated-test script for an automated-testing framework comprising one or more proprietary test devices. The method may also include emulating, by the computing device(s) and via the automated-testing framework and at least one proprietary physical input device associated with the proprietary test device(s), the physical-device input. The method may further include receiving, by the computing device(s), from the proprietary test device(s), and via the automated-testing framework, data generated responsive to the emulated physical-device input. The method may further include comparing, by the computing device(s), the data generated responsive to the emulated physical-device input with expected data specified by the automated-test script for the automated-testing framework.

Another example aspect of the present disclosure is directed to a system. The system may include one or more processors, and a memory storing instructions that when executed by the processor(s) cause the system to perform operations. The operations may include determining a physical-device input associated with an automated-test script for an automated-testing framework comprising one or more proprietary test devices. The operations may also include emulating, via the automated-testing framework, the physical-device input for at least one of the proprietary test device(s). The operations may further include receiving, from the at least one of the proprietary test device(s) and via the automated-testing framework, data generated responsive to the emulated physical-device input. The operations may further include comparing the data generated responsive to the emulated physical-device input with expected data specified by the automated-test script for the automated-testing framework.

A further example aspect of the present disclosure is directed to one or more non-transitory computer-readable media comprising instructions that when executed by one or more computing devices cause the computing device(s) to perform operations. The operations may include determining a physical-device input associated with an automated-test script for an automated-testing framework comprising one or more proprietary test devices. The operations may also include emulating, via the automated-testing framework, the physical-device input for at least one of the proprietary test device(s). The operations may further include receiving, from the at least one of the proprietary test device(s) and via the automated-testing framework, data generated responsive to the emulated physical-device input. The operations may further include comparing the data generated responsive to the emulated physical-device input with expected data specified by the automated-test script for the automated-testing framework.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in this specification, which makes reference to the appended figures, in which.

DETAILED DESCRIPTION

With reference now to the Figures, example embodiments of the present disclosure will be discussed in further detail.

Figure 1:
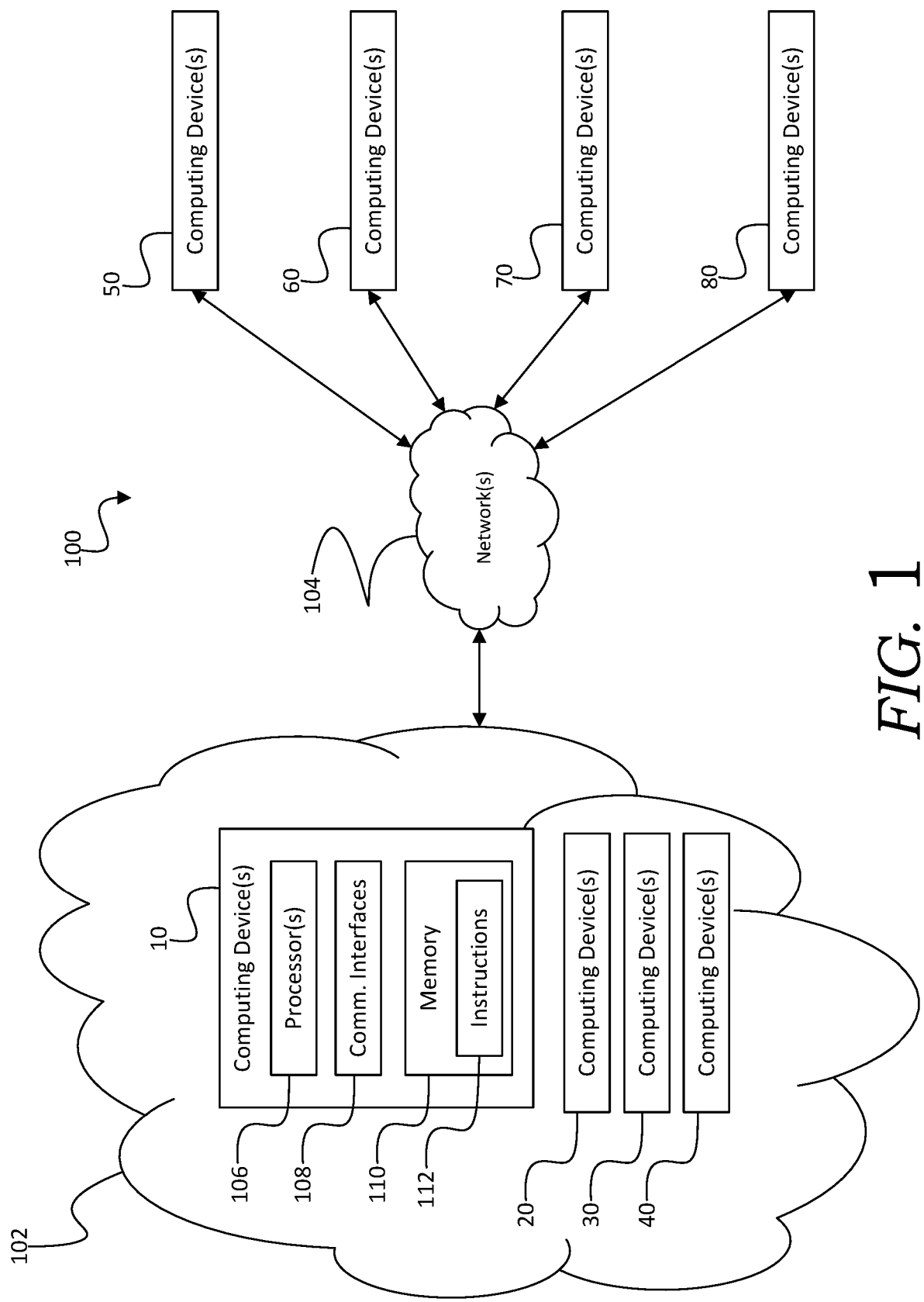
FIG. 1 depicts an example computing environment according to example embodiments of the present disclosure.

FIG. 1 depicts an example computing environment according to example embodiments of the present disclosure.

Referring to FIG. 1, environment 100 may include one or more computing devices (e.g., one or more desktop computers, laptop computers, set-top devices, game consoles, tablet computers, mobile devices, smartphones, wearable devices, servers, and/or the like). For example, environment 100 may include computing devices 10, 20, 30, 40, 50, 60, 70, and/or 80, any one of which may include one or more associated and/or component computing devices (e.g., a mobile device and an associated wearable device, one or more associated servers, and/or the like). Environment 100 may also include one or more networks, for example, network(s) 102 and/or 104 (e.g., one or more wired networks, wireless networks, and/or the like). Network(s) 102 may interface computing device(s) 10, 20, 30, and/or 40, with one another and/or computing device(s) 50, 60, 70, and/or 80 (e.g., via network(s) 104, and/or the like).

Computing device(s) 10 may include one or more processor(s) 106, one or more communication interfaces 108, and memory 110 (e.g., one or more hardware components for storing executable instructions, data, and/or the like). Communication interface(s) 108 may enable computing device(s) 10 to communicate with computing device(s) 20, 30, 40, 50, 60, 70, and/or 80 (e.g., via network(s) 102, 104, and/or the like). Memory 110 may include (e.g., store, and/or the like) instructions 112. When executed by processor(s) 106, instructions 112 may cause computing device(s) 10 to perform one or more operations, functions, and/or the like described herein. It will be appreciated that computing device(s) 20, 30, 40, 50, 60, 70, and/or 80 may include one or more of the components described above with respect to computing device(s) 10.

Unless explicitly indicated otherwise, the operations, functions, and/or the like described herein may be performed by computing device(s) 10, 20, 30, 40, 50, 60, 70, and/or 80 (e.g., by computing device(s) 10, 20, 30, 40, 50, 60, 70, or 80, by any combination of one or more of computing device(s) 10, 20, 30, 40, 50, 60, 70, and/or 80, and/or the like).

Figure 2:
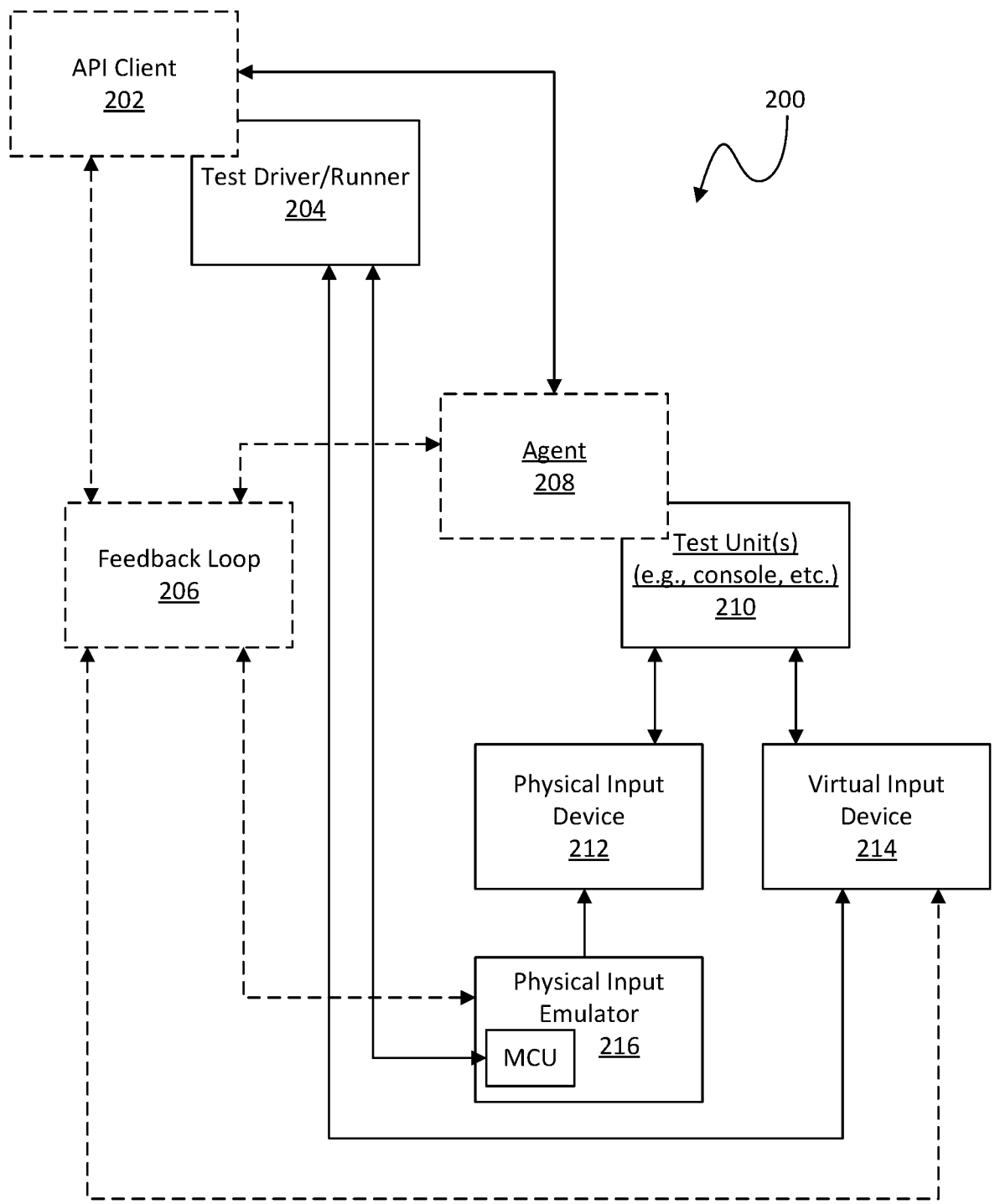
FIG. 2 depicts an example system architecture according to example embodiments of the present disclosure.

FIG. 2 depicts an example system architecture according to example embodiments of the present disclosure.

Referring to FIG. 2, system 200 may include one or more proprietary test units or devices 210 (e.g., one or more game consoles, virtual- and/or augmented-reality headsets, and/or the like). Test device(s) 210 may include, execute, and/or the like agent 208, which may integrate test device(s) 210 into an automated-testing framework associated with test driver/runner 204 via its API client 202, and/or the like. In some embodiments, test device(s) 210 may execute one or more applications (e.g., a gaming application, and/or the like), and agent 208 may be an object associated with the testing-framework that is included in a collection (e.g., tree, and/or the like) of objects for the application(s), and/or the like. For example, in some embodiments, system 200 may implement one or more aspects of the technologies described in U.S. Pat. No. 11,216,358, issued Jan. 4, 2022, to Mayhew et al., and entitled "VIDEO GAME TESTING AND AUTOMATION FRAMEWORK," the disclosure of which is incorporated by reference herein in its entirety.

Feedback loop 206 may interface the automated-testing framework (e.g., API client 202, agent 208, and/or the like) with test device(s) 210 via physical input emulator 216 (e.g., via an integrated microcontroller unit, and/or the like), which may physically interface with physical input device 212 (e.g., a gamepad controller, one or more sensors for a virtual- and/or augmented-reality headset, and/or the like), which may in turn physically interface with test device(s) 210, and/or the like. Additionally or alternatively, feedback loop 206 may interface the automated-testing framework (e.g., API client 202, agent 208, and/or the like) with test device(s) 210 via virtual input device 214, which may interface with test device(s) 210, and/or the like.

Figure 3:
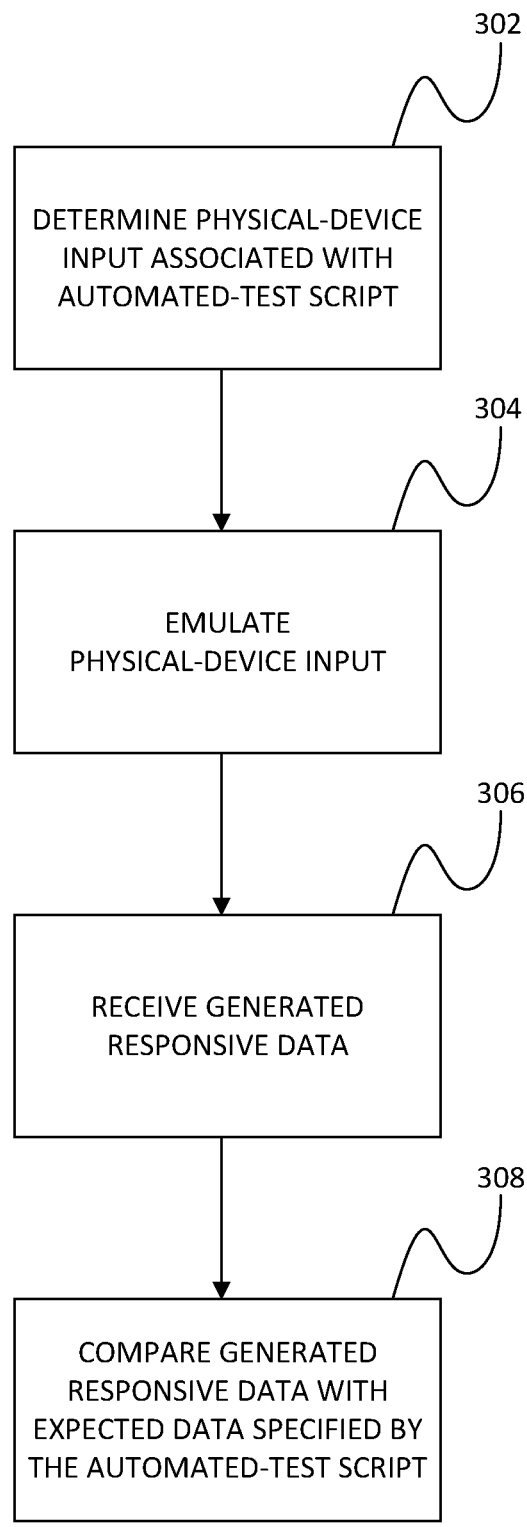
FIG. 3 depicts one or more example methods according to example embodiments of the present disclosure.

FIG. 3 depicts one or more example methods according to example embodiments of the present disclosure.

Referring to FIG. 3, at (302), one or more computing devices may determine a physical-device input associated with an automated-test script for an automated-testing framework comprising one or more proprietary test devices. For example, test driver/runner 204 may determine a physical-device input (e.g., a key sequence associated with waking up or powering on one or more devices, moving a character within a gaming application, and/or the like) associated with an automated-test script for an automated-testing framework that includes test device(s) 210, and/or the like.

At (304), the computing device(s) may emulate, via the automated-testing framework, the physical-device input for at least one of the proprietary test device(s). For example, test driver/runner may emulate (e.g., via physical input emulator 216, physical input device 212, virtual input device 214, and/or the like) the physical-device input associated with the automated-test script for at least one of test device(s) 210. In some embodiments, test device(s) 210 may include a proprietary game console, and/or the like. In some of such embodiments, emulating the physical-device input may include emulating input from at least one proprietary gamepad controller for such a proprietary game console, and/or the like. Additionally or alternatively, in some embodiments, test device(s) 210 may include at least one of a proprietary virtual- or augmented-reality headset, and/or the like. In some of such embodiments, emulating the physical-device input may include emulating input from one or more proprietary sensors for such a proprietary virtual- or augmented-reality headset, and/or the like.

At (306), the computing device(s) may receive, from the at least one of the proprietary test device(s) and via the automated-testing framework, data generated responsive to the emulated physical-device input. For example, test driver/runner 204 may receive from test device(s) 210 (e.g., via agent 208, API client 202, feedback loop 206, and/or the like) data generated responsive to the emulated physical-device input.

At (308), the computing device(s) may compare the data generated responsive to the emulated physical-device input with expected data specified by the automated-test script for the automated-testing framework. For example, test driver/runner 204 may compare the received data generated responsive to the emulated physical-device input with expected data specified by the automated-test script, e.g., to determine whether it indicates an expected condition, the application successfully handled the test condition, and/or the like.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein may be implemented using a single device or component and/or multiple devices or components working in combination. Databases and/or applications may be implemented on a single system and/or distributed across multiple systems. Distributed components may operate sequentially and/or in parallel.

Various connections between elements are discussed in the above description. These connections are general and, unless specified otherwise, may be direct and/or indirect, wired and/or wireless. In this respect, the specification is not intended to be limiting.

The depicted and/or described steps are merely illustrative and may be omitted, combined, and/or performed in an order other than that depicted and/or described; the numbering of depicted steps is merely for ease of reference and does not imply any particular ordering is necessary or preferred.

The functions and/or steps described herein may be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors of a computer and/or other data-processing device. The computer-executable instructions may be stored on a computer-readable medium such as a hard disk, optical disk, removable storage media, solid-state memory, read-only memory (ROM), random-access memory (RAM), or the like. As will be appreciated, the functionality of such instructions may be combined and/or distributed as desired. In addition, the functionality may be embodied in whole or in part in firmware and/or hardware equivalents, such as integrated circuits, application-specific integrated circuits (ASICs), field-programmable gate arrays (FPGAs), or the like. Particular data structures may be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein may be embodied as a method, system, apparatus, and/or one or more computer-readable media storing computer-executable instructions. Accordingly, aspects may take the form of an entirely hardware embodiment, an entirely software embodiment, an entirely firmware embodiment, and/or an embodiment combining software, hardware, and/or firmware aspects in any combination.

As described herein, the various methods and acts may be operative across one or more computing devices and/or networks. The functionality may be distributed in any manner or may be located in a single computing device (e.g., server, client computer, user device, or the like).

Aspects of the disclosure have been described in terms of illustrative embodiments thereof. Numerous other embodiments, modifications, and/or variations within the scope and spirit of the appended claims may occur to persons of ordinary skill in the art from a review of this disclosure. For example, one of ordinary skill in the art may appreciate that the steps depicted and/or described may be performed in other than the recited order and/or that one or more illustrated steps may be optional and/or combined. Any and all features in the following claims may be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment may be used with another embodiment to yield a still further embodiment. Thus, it is intended that the present disclosure cover such alterations, variations, and/or equivalents.

What is claimed is:

1. A method comprising:
   determining, by one or more computing devices, a physical-device input associated with an automated-test script for an automated-testing framework comprising one or more proprietary test devices;
   emulating, by the one or more computing devices and via the automated-testing framework and at least one proprietary physical input device associated with the one or more proprietary test devices, the physical-device input;
   receiving, by the one or more computing devices, from the one or more proprietary test devices, and via the automated-testing framework, data generated responsive to the emulated physical-device input; and
   comparing, by the one or more computing devices, the data generated responsive to the emulated physical-device input with expected data specified by the automated-test script for the automated-testing framework.

2. The method of claim 1, wherein:
   the one or more proprietary test devices comprise at least one proprietary game console;
   the at least one proprietary physical input device comprises at least one proprietary gamepad controller for the at least one proprietary game console; and
   emulating the physical-device input comprises emulating input from the at least one proprietary gamepad controller for the at least one proprietary game console.

3. The method of claim 1, wherein:
   the one or more proprietary test devices comprise at least one of a proprietary virtual- or augmented-reality headset;
   the at least one proprietary physical input device comprises one or more proprietary sensors of the at least one of the proprietary virtual- or augmented-reality headset; and
   emulating the physical-device input comprises emulating input from the one or more proprietary sensors of the at least one of the proprietary virtual- or augmented-reality headset.

4. The method of claim 1, comprising physically interfacing at least one of the one or more computing devices with at least one of the one or more proprietary test devices via the at least one proprietary physical input device.

5. The method of claim 1, comprising communicating, by the one or more computing devices and based at least in part on the automated-test script, with at least one of the one or more proprietary test devices via an agent associated with the automated-testing framework and executing on the at least one of the one or more proprietary test devices.

6. The method of claim 5, wherein:
   the automated-testing framework is configured to test a gaming application executing on the at least one of the one or more proprietary test devices; and
   the agent associated with the automated-testing framework is included as an object in a collection of game objects for the gaming application.

7. A system comprising:
   one or more processors; and
   a memory storing instructions that when executed by the one or more processors cause the system to perform operations comprising:
      determining a physical-device input associated with an automated-test script for an automated-testing framework comprising one or more proprietary test devices;
      emulating, via the automated-testing framework, the physical-device input for at least one of the one or more proprietary test devices;
      receiving, from the at least one of the one or more proprietary test devices and via the automated-testing framework, data generated responsive to the emulated physical-device input; and
      comparing the data generated responsive to the emulated physical-device input with expected data specified by the automated-test script for the automated-testing framework.

8. The system of claim 7, wherein:
the one or more proprietary test devices comprise at least one proprietary game console; and
emulating the physical-device input comprises emulating input from at least one proprietary gamepad controller for the at least one proprietary game console.

9. The system of claim 7, wherein:
the one or more proprietary test devices comprise at least one of a proprietary virtual- or augmented-reality headset; and
emulating the physical-device input comprises emulating input from one or more proprietary sensors of the at least one of the proprietary virtual- or augmented-reality headset.

10. The system of claim 7, wherein the operations comprise interfacing the system with the at least one of the one or more proprietary test devices via at least one proprietary physical input device.

11. The system of claim 7, wherein the operations comprise interfacing the system with the at least one of the one or more proprietary test devices via at least one virtual device configured to emulate at least one proprietary physical input device.

12. The system of claim 7, wherein the operations comprise communicating, based at least in part on the automated-test script, with the at least one of the one or more proprietary test devices via an agent associated with the automated-testing framework and executing on the at least one of the one or more proprietary test devices.

13. The system of claim 12, wherein:
the automated-testing framework is configured to test a gaming application executing on the at least one of the one or more proprietary test devices; and
the agent associated with the automated-testing framework is included as an object in a collection of game objects for the gaming application.

14. One or more non-transitory computer-readable media comprising instructions that when executed by one or more computing devices cause the one or more computing devices to perform operations comprising:
determining a physical-device input associated with an automated-test script for an automated-testing framework comprising one or more proprietary test devices;
emulating, via the automated-testing framework, the physical-device input for at least one of the one or more proprietary test devices;
receiving, from the at least one of the one or more proprietary test devices and via the automated-testing framework, data generated responsive to the emulated physical-device input; and
comparing the data generated responsive to the emulated physical-device input with expected data specified by the automated-test script for the automated-testing framework.

15. The one or more non-transitory computer-readable media of claim 14, wherein:
the one or more proprietary test devices comprise at least one proprietary game console; and
emulating the physical-device input comprises emulating input from at least one proprietary gamepad controller for the at least one proprietary game console.

16. The one or more non-transitory computer-readable media of claim 14, wherein:
the one or more proprietary test devices comprise at least one of a proprietary virtual- or augmented-reality headset; and
emulating the physical-device input comprises emulating input from one or more proprietary sensors of the at least one of the proprietary virtual- or augmented-reality headset.

17. The one or more non-transitory computer-readable media of claim 14, wherein the operations comprise interfacing the one or more computing devices with the at least one of the one or more proprietary test devices via at least one proprietary physical input device.

18. The one or more non-transitory computer-readable media of claim 14, wherein the operations comprise interfacing the one or more computing devices with the at least one of the one or more proprietary test devices via at least one virtual device configured to emulate at least one proprietary physical input device.

19. The one or more non-transitory computer-readable media of claim 14, wherein the operations comprise communicating, based at least in part on the automated-test script, with the at least one of the one or more proprietary test devices via an agent associated with the automated-testing framework and executing on the at least one of the one or more proprietary test devices.

20. The one or more non-transitory computer-readable media of claim 19, wherein:
the automated-testing framework is configured to test a gaming application executing on the at least one of the one or more proprietary test devices; and
the agent associated with the automated-testing framework is included as an object in a collection of game objects for the gaming application.

* * * * *